(12) United States Patent
Arnold et al.

(10) Patent No.: US 10,680,293 B2
(45) Date of Patent: Jun. 9, 2020

(54) DEVICE FOR HARVESTING MECHANICAL ENERGY THROUGH A PIEZOELECTROCHEMICAL EFFECT

(71) Applicants: Craig B. Arnold, Princeton, NJ (US); John Cannarella, Princeton, NJ (US)

(72) Inventors: Craig B. Arnold, Princeton, NJ (US); John Cannarella, Princeton, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 148 days.

(21) Appl. No.: 15/139,768

(22) Filed: Apr. 27, 2016

(65) Prior Publication Data

US 2016/0315358 A1 Oct. 27, 2016

Related U.S. Application Data

(60) Provisional application No. 62/153,172, filed on Apr. 27, 2015.

(51) Int. Cl.
*H01M 4/02* (2006.01)
*H01M 4/13* (2010.01)
(Continued)

(52) U.S. Cl.
CPC ............ *H01M 10/46* (2013.01); *G01D 11/00* (2013.01); *H01M 14/00* (2013.01)

(58) Field of Classification Search
None
See application file for complete search history.

(56) References Cited

U.S. PATENT DOCUMENTS

| 7,686,974 | B2 * | 3/2010 | Priya | C04B 35/493 252/62.9 PZ |
| 2006/0130589 | A1 * | 6/2006 | Jackson | B60C 23/041 73/730 |
| 2014/0342192 | A1 * | 11/2014 | Wang | H01M 4/505 429/7 |

OTHER PUBLICATIONS

Barvosa-Carter, et al. "Solid-State Actuation Based on Reversible Li Electroplating", Proceedings of SPIE, vol. 5761, pp. 90-97, (2005).
(Continued)

*Primary Examiner* — Cynthia H Kelly
*Assistant Examiner* — Julian Anthony
(74) *Attorney, Agent, or Firm* — Meagher Emanuel Laks Goldberg & Liao, LLP (57) ABSTRACT

Mechanical energy harvesting is an increasingly important method of providing power to distributed sensor networks where physical connection to a power source is impractical. Conventional methods use vibrations to actuate a piezoelectric element, coil/magnet assembly, or capacitor plates, thereby generating an electric current. The low charge-density of these devices excludes their application in low frequency and static load sources, with the lowest frequency reported devices limited to 10 Hz. These frequency limitations can be overcome by exploiting the piezoelectrochemical effect, a similar but physically distinct effect from the piezoelectric effect whereby an applied mechanical load alters the thermodynamics of an electrochemical reaction to produce a voltage/current. Piezoelectrochemical energy harvesters are expected to produce orders of magnitude more energy per load cycle than piezoelectrics and comparable power capabilities. These characteristics make piezoelectrochemical energy harvesters ideal for application in low-frequency and static loading scenarios for which conventional mechanical energy harvesting technology is poorly suited. Examples of such load sources include, but are not (Continued)

limited to, human footsteps, vehicular loads, and pressure vessels.

23 Claims, 7 Drawing Sheets

(51) Int. Cl.
*H01M 12/00* (2006.01)
*H01M 4/58* (2010.01)
*H01M 10/46* (2006.01)
*G01D 11/00* (2006.01)
*H01M 14/00* (2006.01)

(56) References Cited

OTHER PUBLICATIONS

Beeby, et al. "Energy Harvesting Vibration Sources for Microsystems Applications" Measurement and Science Technology, vol. 17, pp. 175-195, (2006).
Beeby, et al. "A Micro Electromagnetic Generator for Vibration Energy Harvesting", Journal of Micromechanics and Microengineering, vol. 17, pp. 1257-1265, (2007).
Bowen, et al. "Piezoelectric and Ferroelectric Materials and Structures for Energy Harvesting Applications", Energy and Environmental Science, vol. 7, pp. 25-44, (2014).
Cannarella, et al. On the Coupling Between Stress and Voltage in Lithium Ion Pouch Cells, Proceedings of SPIE, vol. 91150, (2014).
Chin, et al. "Lithium Rechargeable Batteries as Electromechanical Actuators", Electrochemical and Solid-Sate Letters, vol. 9, pp. A134-A138, (2006).
Cook-Chennault, et al. "Powering MEMS Portable Devices—A Review of Non-Regenerative and Regenerative Power Supply Systems with Special Emphasis on Piezoelectric Energy Harvesting Systems" Smart Materials and Structures, vol. 17, (2008).
Ferrese, et al. "Mechanical Deformation of a Lithium-Metal Anode Due to a Very Stiff Separator", Journal of the Electrochemical Society, vol. 161, pp. A1350-A1359, (2014).
Glynn-Jones, et al. "An Electromagnetic, Vibration-Powered Generator for Intelligent Sensor Systems", Sensors and Actuators, vol. 110, pp. 344-349, (2004).
Gu, et al. "Impact-DRiven, Frequency Up-Converting Coupled Vibration Energy Harvesting Device for Low Frequency Operation", Smart Materials and Structures, vol. 20, (2011).
Jacques, et al. "Piezo-electrochemical Effect in Lithium-Intercalated Carbon Fibres", vol. 35, pp. 65-67, (2013).
Kim, et al. "A Review of Piezoelectric Energy Harvesting Based on Vibration", International Journal of Precision Engineering and Manufacturing, vol. 12, No. 6, pp. 112-1141, (2011).
Koyama, et al. "Harnessing the Actuation Potential of Solid-State Intercalation Compounds", Advanced Functional Materials, vol. 16, pp. 492-498 (2006).
Lee, et al. "An Electrochemical System for Efficiently Harvesting Low-Grade Heat Energy", Nature Communications, vol. 5, (2014).
Massey, et al. "Graphite Intercalation Compounds as Actuation Materials", Proceedings of the International Mechanical Engineering Congress and Exposition, Anaheim, California (Nov. 13, 2004).
Massey, et al. "Reversible Work by Electrochemical Intercalation of Graphitic Materials", Smart Structures and Materials, vol. 5759, (2005).
Murillo, et al. "Harvester-on-Chip: Design of a Proof of Concept Prototype", Microelectronic Engineering, vol. 86, pp. 1183-1186, (2009).
Ohzuku, et al. "Formation of Lithium-Grpahite Intercalation Compounds in Nonaqueous Electrolytes and Their Application as a Negative Eelctrode for a Lithium Ion (Shuttlecock) Cell", Journal of the Electrochemical Society, vol. 140, No. 9, (Sep. 1993).
Pellegrini, et al. "Bistable Vibration Energy Harvesters: A Review", Journal of Intelligent Material Systems and Structures, vol. 24, No. 11, pp. 1303-1312, (2012).
Priya, "Advances in Energy Harvesting Using Low Profile Piezoelectric Transducers", Journal of Electroceramics, vol. 19, pp. 165-182, (2007).
Radousky, et al. "Energy Harvesting: an Integrated View of Materials, Devices, and Applications", Nanotechnology, vol. 23, (2012).
Reimers, et al. "Eletrochemical and In Situ X-Ray Diffraction Studies of Lithium Intercalation in LixCoO2", Journal of the Electrochemical Society, vol. 139, No. 8 (Aug. 1992).
Salib, et al. "Optomechanical Actuator in the Form of Graphite", Proceedings of SPIE, vol. 2716, (1996).
Sethuraman, et al. "In Situ Measurements of Stress-Potential Coupling in Lithiated Silicon", Journal of the Electrochemical Society, vol. 157, pp. A1253-A1261, (2010).
Yang, et al. "Charging-Free Electrochemical System for Harvesting Low-Grade Thermal Energy", Proceedings of the National Academy of Sciences, vol. 111, vol. 48, (Dec. 2014).
Yen, et al. "A Variable-Capacitance Vibration-to-Electric Energy Harvester", IEEE Transactions on Circuits and Systems: Regular Papers, vol. 53, No. 2, (Feb. 2006).

\* cited by examiner

DEVICE FOR HARVESTING MECHANICAL ENERGY THROUGH A PIEZOELECTROCHEMICAL EFFECT

CROSS-REFERENCE TO PRIOR FILED APPLICATIONS

This application claims priority to U.S. provisional applications 62/153,172 which was filed on Apr. 27, 2015 which is incorporated herein in its entirety.

TECHNICAL FIELD

This invention relates generally to harvesting mechanical energy and in particular utilizing piezoelectrochemical effects to convert mechanical energy into electrical energy.

BACKGROUND

Mechanical energy harvesting is an increasingly important method of providing power. This power can be used for a variety of tasks, including providing power to distributed sensor networks where physical connection to a power source is impractical. Conventional mechanical energy harvesting methods rely on piezoelectric, electromagnetic, or electrostatic conversion of mechanical energy from ambient vibration sources to electrical energy. However, the low energy density of these devices excludes their application in low frequency and static load sources, with the lowest frequency reported devices limited to 10 Hz.

For example, a 50 MPa mechanical load source at 0.01 Hz could be used in sensor applications with a device capable of harvesting $10^{-2}$ J/cm$^3$ per cycle. However, the device would require an energy density of $10^{-1}$ J/cm$^3$ per cycle to be viable for mobile electronics applications. These applications are determined by comparing average power densities characteristic of each application based on energy density of a battery divided by application run time; this method eliminates the need to make assumptions about the acceptable size of the power source required for an application.

A way to overcome these limitations, to provide a device capable of use in low frequency applications, is therefore desirable.

SUMMARY OF THE INVENTION

Disclosed is an electrochemical cell comprising a plurality of electrodes and an electrolyte, wherein at least one of plurality of electrodes is a piezoelectrochemical material. This electrochemical cell may function as a battery, and may include a separator. The piezoelectrochemical material can comprise a variety of materials, but preferably comprises at least one of graphite, lithium, carbon, lithium titanate, LiCoO$_2$, silicon, manganese oxide, a graphite intercalation compound, or a lithium metal oxide. The electrolyte preferably comprises a solid. The magnitude of the peak coupling factor for these cells is preferably greater than 0.001 mV/MPa, and more preferably between 0.001 and 50 mV/MPa when the piezoelectrochemical material comprises lithium. The theoretical energy density per unit stress of the piezoelectrochemical material is preferably greater than or equal to 1 mJ/cm$^3$/MPa, and more preferably between and including 1 mJ/cm$^3$/MPa and 5,000 mJ/cm$^3$/MPa. The theoretical power density of the piezoelectrochemical material is preferably greater than or equal to $1\times10^{-4}$ mW/cm$^3$ with an applied load of 50 MPa, and more preferably between and including $1\times10^{-4}$ mW/cm$^3$ and 20 mW/cm$^3$ with an applied load of 50 MPa.

Also disclosed is a system for harvesting mechanical energy, comprising at least one electrochemical cell and at least one other energy storage device. Preferably, the energy storage device is at least one of a capacitor, battery, or another piezoelectrochemical cell.

Also disclosed is a distributed sensor network, comprising: a plurality of sensors and a piezoelectrochemical cell.

Also disclosed is a method for converting mechanical to electrical energy. This method requires selecting electrode materials for an electrochemical cell such that at least one electrode undergoes a change in its potential as a consequence of an applied stress, configuring the electrochemical cell to discharge at a first voltage while a mechanical stress is applied, and configuring the electrochemical cell to charge at a second voltage when the mechanical stress is removed, provided that the second voltage is less than the first voltage.

The method may also include any of several additional steps, including selecting a material for a first electrode such that it comprises a material having an opposite-signed coupling constant from a second electrode, selecting a material for a first electrode such that it comprises a material having a greater coupling constant than a second electrode, and/or arranging the configuration of the electrochemical cell such that the mechanical stress applied on a first side of the electrochemical cell is capable of being different than the applied mechanical stress on a second side of the electrochemical cell. This method may be used to receive mechanical stress from human footsteps, vehicular tires, or pressure vessels, and preferably involves selecting materials such that the coupling constant for the electrochemical cell is between about 0.001 mV/MPa and about 50 mV/MPa under uniaxial loading and expansion. Stress can be applied in several ways, including bending, and may be uniform or non-uniform in one or more directions.

DETAILED DESCRIPTION

The term "piezoelectrochemical effect", as used herein, is defined as the change in equilibrium potential due to an applied stress exhibited by a material. Although similar in practice to the piezoelectric effect, the piezoelectrochemical effect is a fundamentally different phenomenon that arises from a change in the thermodynamics of an electrochemical reaction due to applied stress. This piezoelectrochemical coupling has been studied in a few electrochemical systems, most notably in lithium-silicon alloying systems, lithium-graphite systems, and in graphite-sulfiric acid systems, and in full pouch cells. The reverse effect in which applied charge is used to generate mechanical work has been studied in work on electrochemical actuators for lithium-ion materials (HOPG, C/LCO, lithium metal) and for other graphite intercalation compounds.

The frequency limitations of more conventional mechanical energy harvesting devices can be overcome by creating devices that incorporate the piezoelectrochemical effect. Materials that exhibit the piezoelectrochemical effect are termed piezoelectrochemical materials. Piezoelectrochemical materials can be expected to produce orders of magnitude more energy per volume than a conventional mechanical energy harvesting materials (e.g. a piezoelectric material) due to the high energy density associated with Faradaic reactions.

Several variables define the strength of the piezoelectrochemical effect. One such variable is the coupling factor k that relates change in equilibrium potential $U_o$ of a material with change in an applied uniaxial mechanical stress σ as $$k = \frac{\partial U_o}{\partial \sigma} \quad \text{(Eq. 1)}$$

Figure 2:
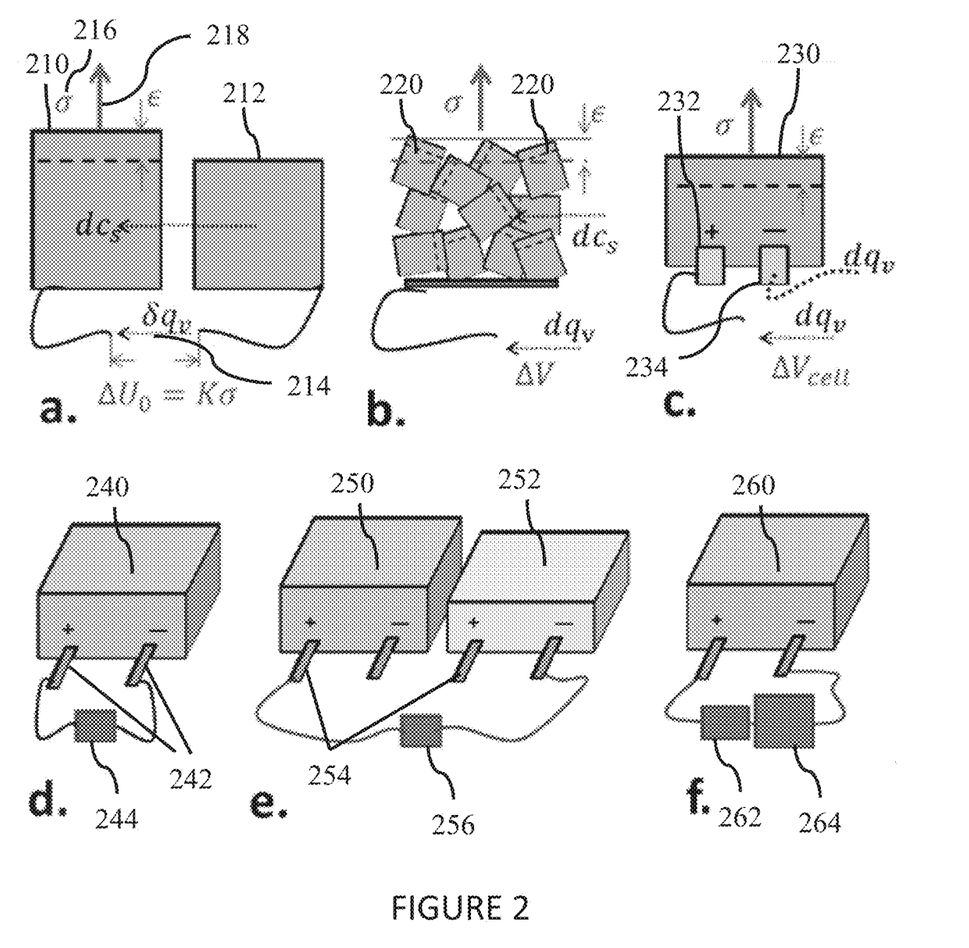
FIG. 2 is an illustration of piezoelectrochemical coupling and various arrangements of the present invention.

An expression for k can be derived by a thermodynamic analysis of the scenario shown in FIG. 2a, which shows two identical crystals of an electrochemically active material. For the sake of simplicity, this material is assumed to expand along only a single axis due to an electrochemical reaction, and is mechanically loaded along that same axis. Physically, this could be thought of as a crystal of lithiated graphite, which expands primarily along its c axis. The coupling factor can then be calculated by equating the mechanical work of producing strain ε against stress σ to the electrochemical work associated with electrically driving an electrochemical reaction between the two identical materials:

$$\Delta \sigma d\varepsilon = \Delta U_o dq_v \quad \text{(Eq. 2)}$$

It can be seen from the above equation that k can be expressed as:

$$k = \frac{\partial \varepsilon}{\partial q_v} \quad \text{(Eq. 3)}$$

This expression shows that the coupling W between stress and voltage is a consequence of the work of mechanical expansion due to the electrochemical motion of charged species. This is analogous to PV work in classic thermodynamic piston-cylinder analyses of ideal gasses, and agrees with similar expressions for this mechano-electrochemical coupling derived in the literature. While k is derived for the case of uniaxial loading and expansion here, a similar procedure could be used to derive k for arbitrary loads and expansions to find that k is a tensor property depending on the directionality of expansion and loading.

The piezoelectrochemical effect can be quantified by defining a coupling factor $k_{ij}$ that relates change in equilibrium potential $U_o$ with change in applied mechanical stress $\sigma_{ij}$ as:

$$k_{ij} = \frac{\partial U_o}{\partial \sigma_{ij}} \quad \text{(Eq. 10)}$$

Coupling factor $k_{ij}$ can be calculated for a piezoelectrochemical material through thermodynamic considerations of the electrical and mechanical energies associated with an electrochemical reaction that produces a mechanical expansion. To arrive at an expression for $k_{ij}$, consider the simple case of an intercalation material that expands by a strain ε along a single axis due to the electrochemical insertion of a small amount of electroactive species in terms of concentration $dc_s$. With two identical crystals (210) and (220), shown schematically in FIG. 2a, one can measure the potential difference between them (214) assuming they are connected by an electrolyte. For identical unloaded crystals, the potential difference between them is 0 V. Neglecting kinetic losses (i.e. assuming infinitely fast kinetics), a small amount of electroactive species $dc_s$ could be moved between the two materials without the application of electrical work. However, if one of the crystals is mechanically loaded with stress σ (216) along its axis of expansion (218), the movement of $dc_s$ produces a mechanical work $W_m$ equal to $$W_m = \sigma \varepsilon \quad \text{(Eq. 11)}$$

This mechanical work requires that electrical energy must be expended to electrochemically move $dc_s$ from the unloaded crystal to the loaded crystal. This electrical work $W_e$ is equal to $$W_e = \Delta U_o nF dc_s \quad \text{(Eq. 12)}$$

where $\Delta U_o$ is the potential difference between the loaded and unloaded crystals, n is the number of electrons transferred per number of inserted electroactive species, and F is Faraday's constant. The equivalence of $W_m$ and $W_e$ is thermodynamically enforced by conservation of energy; their inequality would violate thermodynamics by permitting a perpetual motion system. Equating $W_m$ and $W_e$ and evaluating Equation 10 for $k_i$ gives $$k_i = \frac{1}{nF} \frac{\partial \varepsilon_i}{\partial c_s} \quad \text{(Eq. 13)}$$

where $k_i$ is the coupling factor for a crystal loaded uniaxially along direction i. The above analysis can also be applied for composite structures of piezoelectrochemical materials such as a composite electrode or full battery cell, shown schematically in FIGS. 2b and 2c, respectively. If uniaxial loading and expansion is again assumed for the composite structures, the same expression for coupling factor is derived. A similar analysis could be performed to show that for a crystal of arbitrary expansion characteristics and mechanical loading, a coupling factor $k_{ij}$ could be defined for each combination of mechanical load and expansion. Furthermore, although the above is derived by considering a single crystal, a similar analysis could be conducted for any material that expands against a uniaxial load, such as a polycrystalline particle or a composite electrode.

These materials should therefore also exhibit a similarly defined coupling between stress and voltage, which are represented with K hereinafter to distinguish it from k, which is a fundamental material property. K is related to k through geometric and mechanical relations.

Figure 1:
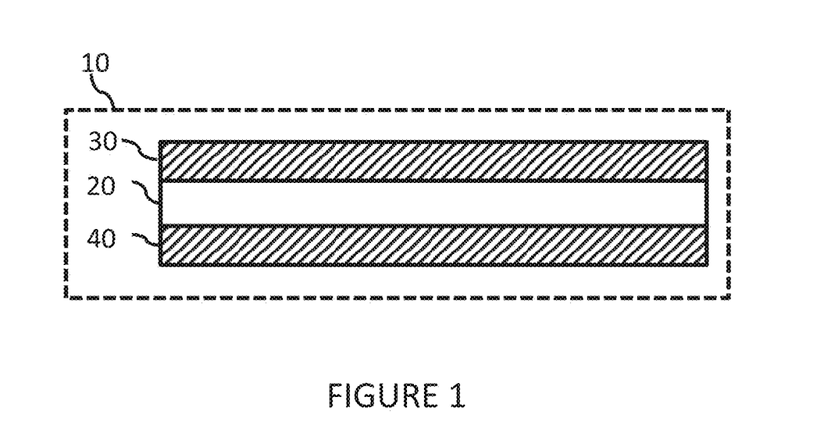
FIG. 1 is a schematic of an embodiment of the present invention.

A piezoelectrochemical device that harvests mechanical energy is necessarily an electrochemical cell. FIG. 1 illustrates one embodiment of such a device. Electrochemical cell (10) is comprised of two electronically conductive electrodes (30 and 40) and an ionically conductive electrolyte (20). In this particular embodiment, the two electrodes (30 and 40) are sandwiched tightly with an ionically conductive membrane (20). Other embodiments do not utilize such separators and simply utilize electrodes in an electrolyte solution. Separators, such as the ionically conductive membrane (20), generally provide charge transport and electrode separation. Separators typically are required to remain in contact with the electrodes, and thus the choice of material for the separator is at least partially dependent on the choice of materials for both the electrolyte and the electrodes. Suitable materials may include, but are not limited to polymer films (e.g., polyethylene, polypropylene, polyvinyl chloride, etc.) and nonwoven fibers (e.g., cotton, nylon, glass, etc.).

A system for harvesting mechanical energy utilizes such a piezoelectrochemical device, and at least one other energy storage device, which may include but is not limited to a capacitor, a battery, and/or another piezoelectrochemical cell.

Figure 7:
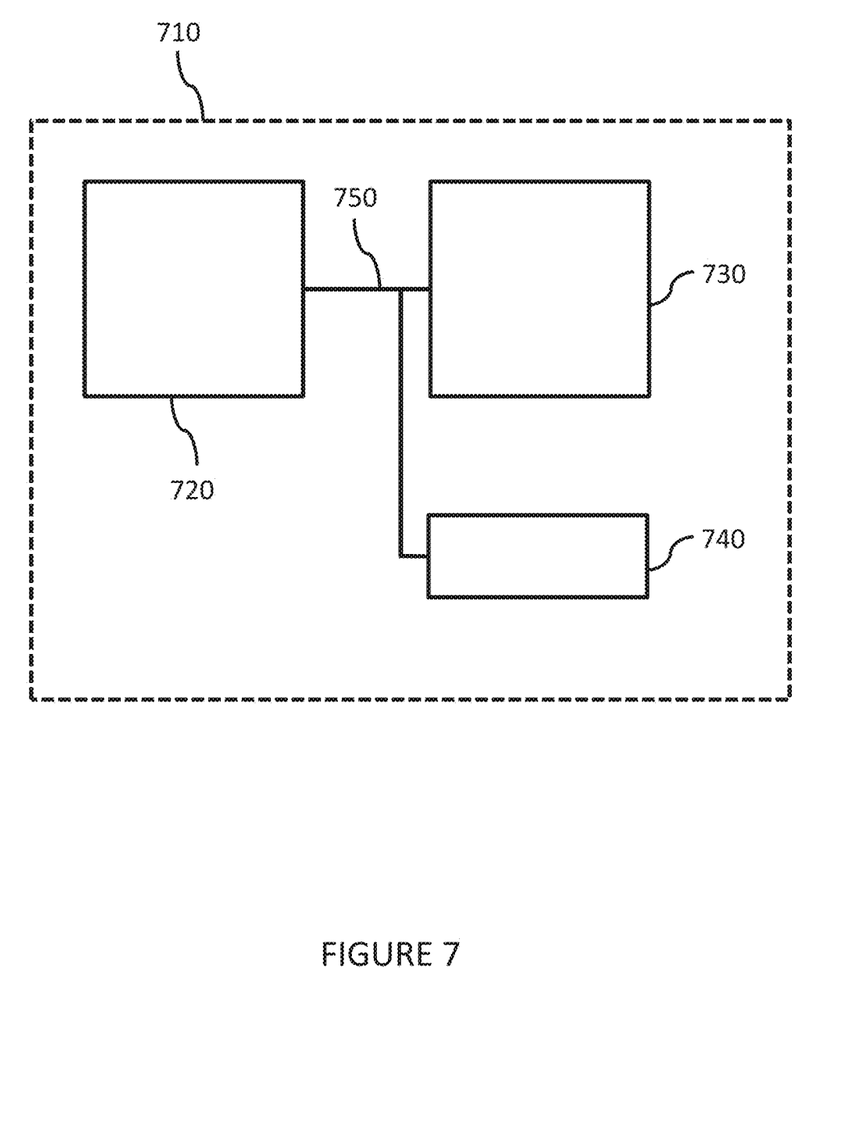
FIG. 7 is a diagram of a system utilizing the present invention.

In addition, these devices and system may be attached to other devices. For example, one embodiment is illustrated in FIG. 7. A distributed sensor network (710) is arranged such that at least one electrochemical cell (720) is adapted to provide an electric connection (750) to one or more of the plurality of sensors (730 and optional sensor 740). Many arrangements and types of sensors are envisioned. For example, a tire pressure sensor monitoring system is one embodiment, utilizing only a single type of sensor for measuring pressure. However, the sensors in FIG. 7 could also be two different sensors; for example, the system could be used in a shoe, where sensor (730) is an accelerometer, and sensor (740) is an optical heart rate monitor.

Generally, at least one of the plurality of electrodes should comprise a piezoelectrochemical material. Preferably, the piezoelectrochemical material should be comprised of at least one of graphite, lithium, carbon, lithium titanate, $LiCoO_2$, silicon, manganese oxide, a graphite intercalation compound, or a lithium metal oxide. Graphite intercalation compounds include but are not limited to compounds such as $C(HSO_4)_x$. The lithium metal oxide includes but is not limited to lithium nickel magnese cobalt oxide, lithium nickel cobalt oxide, and lithium iron phosphate. Exemplary lithium compounds include: $Li_xC_6$, $Li_xCoO_2$, $LiNi_yCo_zO2$, $Li_xNi_yCo_zAl_jO_2$, $Li_xNiO_2$, $Li_xNi_yMn_zCo_jO_2$, $Li_xCoPO_4$, $Li_xFePO_4$, $Li_xMnPO_4$, $Li_xMn_2O_4$, $Li_xNi_{0.5}Mn_{1.5}O_4$, $Li_xFeSO_4F$, $Li_xVPO_4F$, $LiTi_5O_{12}$, $Li_xMn_2O_4$, $Li_xSi$, $Li_xSn$, $Li_xS$, Li Al, and Li(m).

Such a compact construction is designed to minimize energy losses. This construction resembles that used in modern battery cells, in one embodiment, the piezoelectrochemical cell is a battery. Preferably the battery is a lithium-ion battery, and consequently are generally drawn as pouch cells hereinafter. Similar to modern battery designs, the electrodes of the piezoelectrochemical cell are flexible, and optionally may consist of either thin films of electrode material (210) shown in FIG. 2a or a composite electrode comprised of a film of packed electrode particles (220) shown in FIG. 2b.

At standard temperature and pressure, the piezoelectrochemical material may comprise any of several states of matter. Preferably, it is either a solid or liquid at standard temperature and pressure, and more preferably it is a solid at standard temperature and pressure. Additionally, the electrolyte may also comprise any of several states of matter. Preferably, the electrolyte is either a solid or a liquid solution.

One method for converting mechanical to electrical energy using the piezoelectrochemical effect generally requires the following three steps. First, selecting electrode materials for an electrochemical cell such that at least one electrode undergoes a change in its potential as a consequence of an applied stress. Second, configuring the electrochemical cell to discharge at a first voltage while a mechanical stress is applied. And third, configuring the electrochemical cell to charge at a second voltage when the mechanical stress is removed, wherein the second voltage is less than the first voltage. Preferably, the materials are selected such that the coupling constant for the electrochemical cell is between about 0.001 mV/MPa and about 50 mV/MPa under uniaxial loading and expansion.

These methods can be used for a variety of applications, including but not limited to applications where the cell receives mechanical stress from human footsteps, vehicular tires, or pressure vessels. This applied mechanical stress may exist in any form, including compression or tension, from bending the electrochemical cell. The stress can be applied uniformly, or non-uniformly in one or more directions.

Various embodiments of methods utilizing the piezoelectrochemical effect are considered. For example, a material for a first electrode could be selected such that it comprises a material having a greater coupling constant than a second electrode. Alternatively, a device could be configured such that the applied mechanical stress on a first side of the electrochemical cell could be different than the applied mechanical stress on a second side of the electrochemical cell. Or, a material for a first electrode could be selected such that it comprises a material having an opposite-signed coupling constant from a second electrode.

When a piezoelectrochemical cell is loaded uniaxially with both cell electrodes oriented serially with respect to the load such that each experiences the same applied stress, the cell exhibits an effective coupling equal to that of the negative electrode subtracted from that of the positive electrode:

$$K=K_+-K_- \quad \text{(Eq. 4)}$$

Although not required, to maximize K for such a configuration, it is desirable to choose positive and negative electrode materials with opposite signed $K_i$ as seen in Equation 4. This is equivalent to maximizing a cell's overall expansion by choosing an electrode couple that exhibits opposite direction expansions upon oxidation and reduction, since during operation of an electrochemical cell one electrode undergoes oxidation while the other undergoes reduction. A common example of such an electrode couple in the context of lithium-ion batteries is the graphite/lithium cobalt oxide couple: graphite expands upon lithium insertion and lithium cobalt oxide contracts upon lithium insertion.

A piezoelectrochemical cell can be used to harvest energy by discharging at high voltage under an applied mechanical load and recharging at low voltage when the load is removed. The charging/discharging can be made to occur spontaneously if the piezoelectrochemical cell is designed to operate at 0 V.

In practice this can be achieved in multiple ways. One way is illustrated in FIG. 2d, where a single cell (240) with load (244) is designed by choosing positive/negative electrode materials (242) with similar equilibrium potentials such that the voltage between the two positive terminals is 0 V. Another way is illustrated in FIG. 2e, where two cells (250 and 252) under load (256) are designed such that the voltage between the two positive terminals (254) is 0 V. The single cell configuration is the most compact, but places a constricting restriction that both electrodes must have similar equilibrium potentials.

It is also possible to use a single cell (260) under load (262) in a charge-assist configuration shown in FIG. 2f, which relies on external circuitry (264) for charge and discharge. Such a configuration is useful for fundamental study, but generally not practical for most applications. Examples of thermal energy harvesting electrochemical cells in the single cell and charge-assist configurations are known in literature.

Figure 3:
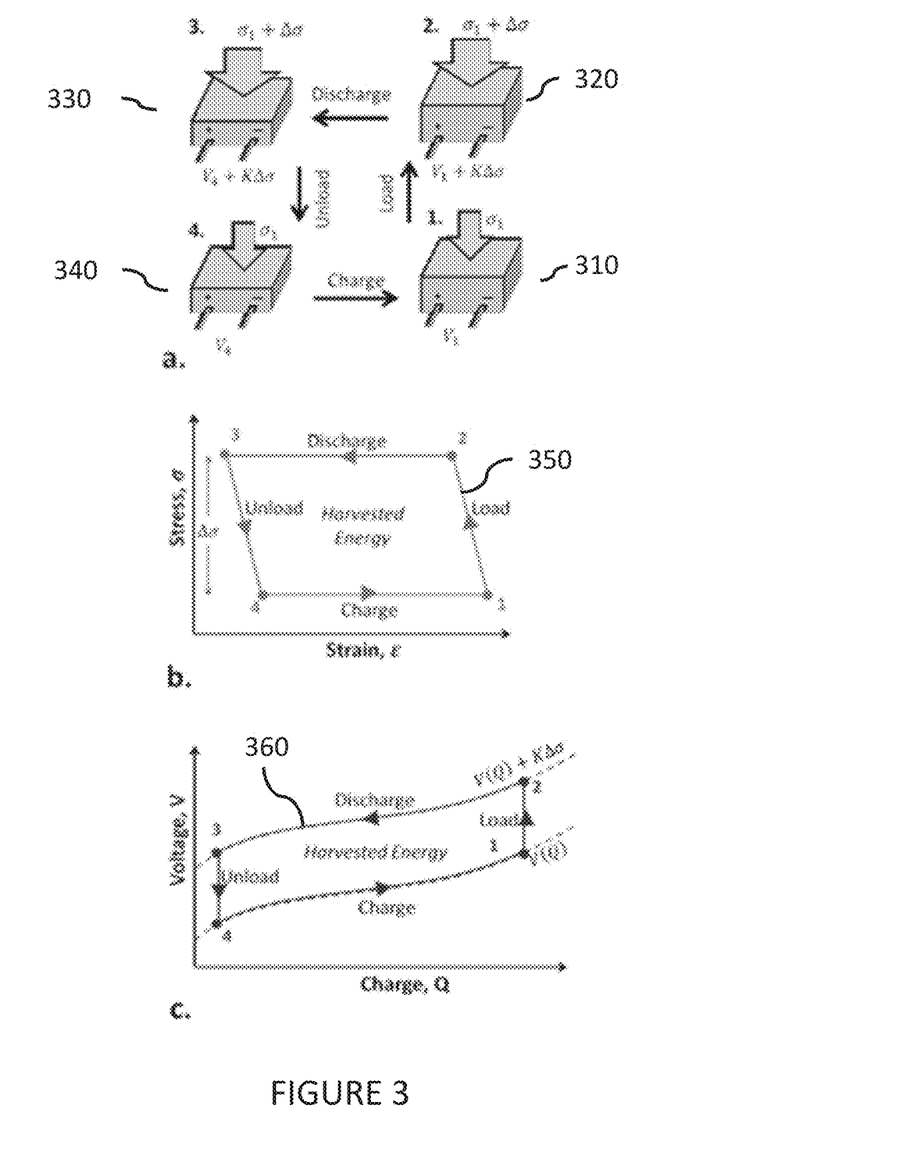
FIG. 3 is a schematic illustration of the piezoelectrochemical cycle process.

The process by which a piezoelectrochemical cell converts mechanical energy to electrical energy is illustrated schematically in FIG. 3. This figure shows a cycle in which a piezoelectrochemical cell is discharged at a high voltage produced by a mechanical load and then recharged at a lower voltage after the mechanical load is removed. This process can be described by the following steps.

Step 1 (310)→Step 2 (320): The mechanical stress on a cell with coupling factor K is increased by $\Delta\sigma$, increasing the cell voltage by $K\Delta\sigma$. In this step, reversible mechanical work is done on the cell due to elastic deformation.

Step 2 (320)→Step 3 (330): The cell is discharged by $\Delta Q$, resulting in a contraction of $\Delta\varepsilon$, where $\Delta\varepsilon$ is the change in engineering strain. In this step, electrical work $\int_0^{\Delta Q} V(Q) + K\Delta\sigma dQ$ is produced by the cell and mechanical work equal to $\Delta\varepsilon(\sigma_1 + \Delta\sigma)$ is done on the cell.

Step 3 (330)→Step 4 (340): The stress is decreased by $\Delta\sigma$ to the original stress $\sigma_1$, reducing the cell voltage by $K\Delta\sigma$. In this step, reversible mechanical work is done by the cell equal to the elastic work in Step 1 (310)→Step 2 (320).

Step 4 (340)→Step 1 (310): The cell is recharged by $\Delta Q$, returning it to its original voltage and strain and completing the cycle. In this step, electrical work $\int_0^{\Delta Q} V(Q) dQ$ is done on the cell and mechanical work equal to $\Delta\varepsilon\sigma_1$ is done by the cell.

The net mechanical work $W_m$ during this process is equal to $$\Delta W_m = \Delta\sigma\Delta\varepsilon_1 \qquad \text{(Eq. 5)}$$

which is calculated by summing the mechanical work contributions in each step. This work is equal to the enclosed area (350) in FIG. 3b. The net electrical work produced by the system is equal to $$W_e = \int_0^{\Delta Q} \sigma K dQ \qquad \text{(Eq. 6)}$$

which is calculated by summing the electrical work contributions in each step. This work is equal to the enclosed area (360) in FIG. 3c. Based on the Equation 3 definition of coupling factor, it can be shown that $W_m$ and $W_e$ are equivalent, neglecting any losses.

In a practical system, losses will reduce the energy harvesting efficiency such that $W_e$ is always less than $W_m$. The sources of loss can be both electrochemical and mechanical, such as overpotentials required to drive the electrochemical reaction and viscoelastic losses during mechanical loading. These losses are rate dependent, such that lower efficiencies are expected for higher rate operation. It should also be noted that it is possible that K varies with Q such that the voltage curves in FIG. 3c are not perfect offsets of each other. This however should not affect above analysis.

As seen in Table 1, the magnitude of the peak coupling factor is currently expected to fall between between 0.001 and 50, when the piezoelectrochemical material comprises lithium. Other piezoelectrochemical materials will necessarily have different ranges expected for the peak coupling factors.

To identify promising piezoelectrochemical materials candidates for low frequency mechanical energy harvesting, two figures of merit used to compare mechanical energy harvesters are defined: single cycle energy density $\Upsilon$ and peak power density $p_v$.

The single cycle energy density $\Upsilon$ is the energy that can be harvested per cubic centimeter of harvester volume during a single mechanical load/unload cycle. The single cycle energy density can be calculated as $$\Upsilon = nF\int_{c_{s,0}}^{c_{s,1}} \sigma K dc_s \qquad \text{(Eq. 7)}$$

Where n is the moles of electrons transferred per mole of species, F is Faraday's constant, and $c_s$ is concentration. Materials with high k values are expected to have high energy density in addition to materials that can sustain a large concentration change ($c_{s,1} - c_{s,0}$). In practice this means materials that exhibit high expansion and flat voltage curves.

The limits of the integrand $c_{s,0}$ and $c_{s,1}$ are determined by the shapes of the equilibrium potential versus concentration curve of the material of interest. If the material is to be used in a non charge-assisted configuration, the limitation to the concentration range is that the initial open circuit potential of the material $U_o(c_{s,0})$ cannot exceed the final open circuit potential of the material when it is under applied stress, $U_o(c_{s,1}) + K\sigma$. In general, values of $c_{s,0}$ and $c_{s,1}$ that result in the large $\Delta c_s$ values translate into higher energy values, as they extend the limits of the integral.

Figure 5:
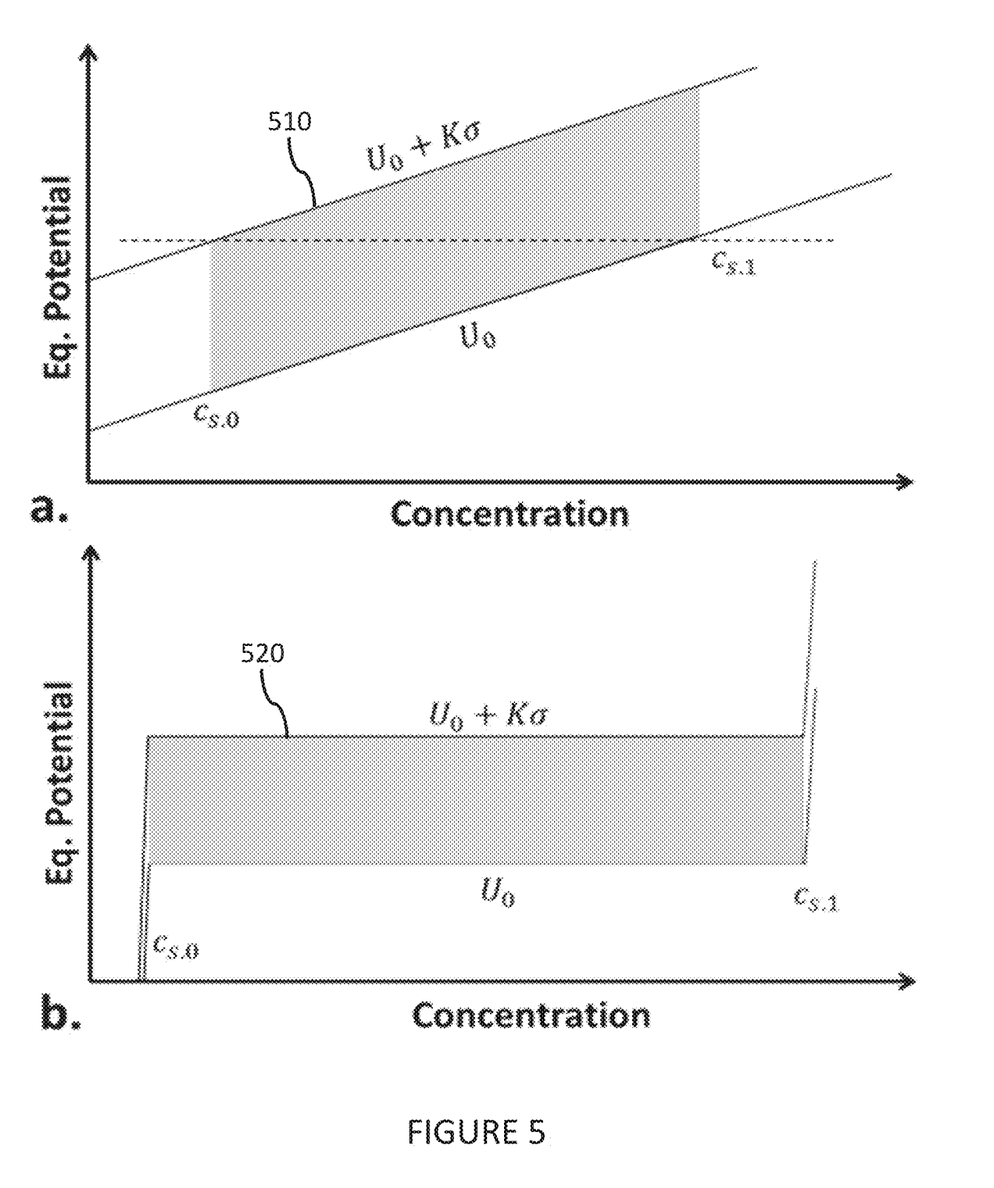
FIG. 5 is a schematic of open circuit potential curves.

The integral in Equation 7 can be approximated for different materials by making the following simplifying assumptions. For materials with a range of concentration $\Delta c_s$ over which equilibrium potential remains constant, this integral can be written as $$\Upsilon = nFK\sigma\Delta c_s \qquad \text{(Eq. 15)}$$

if it is assumed K is constant over the range of $c_s$. This is a reasonable assumption for materials that exhibit a two-phase equilibrium, such as graphite, which exhibits multiple plateaus in its equilibrium potential versus concentration curve corresponding to two-phase regions. In these regions, the equilibrium potential is flat and the rate of expansion with respect to change in concentration is constant. Voltage curve 520 in FIG. 5b is an example of such a curve. Equation 15 can also be rewritten as $$\Upsilon = K\sigma\Delta q_v \qquad \text{(Eq. 16)}$$

which is more familiar in the context of lithium-ion battery materials. Here $q_v$ is the volumetric capacity associated with the given range of concentration and n is set equal to 1. Equation 16 can be used to compare candidate piezoelectrochemical materials for mechanical energy harvesting.

For materials in which the equilibrium potential curve is not flat, as shown by curve 510 in FIG. 5a, a linear variation in equilibrium potential with concentration can be assumed such that can be evaluated as:

$$\Upsilon = \frac{nF}{2}(K\sigma)^2 \left(\frac{\partial U_o}{\partial c_s}\right)^{-1} \qquad \text{(Eq. 17)}$$

This equation is analogous to the expression for energy stored in a parallel plate capacitor, where the $K\sigma$ term is voltage and the $$\left(\frac{\partial U_o}{\partial c_s}\right)^{-1}$$

term is analogous to capacitance. This equation can also be rewritten in terms of charge instead of concentration:

$$\Upsilon = \frac{1}{2}(K\sigma)^2\left(\frac{\partial U_o}{\partial q_v}\right)^{-1} \qquad \text{(Eq. 18)}$$

Equation 18 has the advantage over Equation 17 that $$\left(\frac{\partial U_o}{\partial q_v}\right)$$

is a more commonly reported property, thereby making it easier to estimate $\Upsilon$ for some materials.

Table 1 shows some estimated values $\Upsilon$ for different materials assuming a mechanical loading of 50 MPa. The choice of 50 MPa is somewhat arbitrary, but corresponds to a high stress that is still well below the yield strength of many hard materials. As seen in Table 1, values for piezoelectrochemical systems can currently be expected to be on the order of 1-5,000 mJ/cm$^3$/MPa. This is much higher than the theoretical energy limits for conventional mechanical energy harvesters which are 4-5 mJ/cm$^3$ for electrostatic and electromagnetic, and 15-20 mJ/cm$^3$ for piezoelectric assuming the same mechanical loading. Note that higher energy densities than those shown in Table 1 may be possible for piezoelectrochemical systems, as Table 1 only considers the limited piezoelectrochemical materials systems for which relevant experimental data are available.

Figure 6:
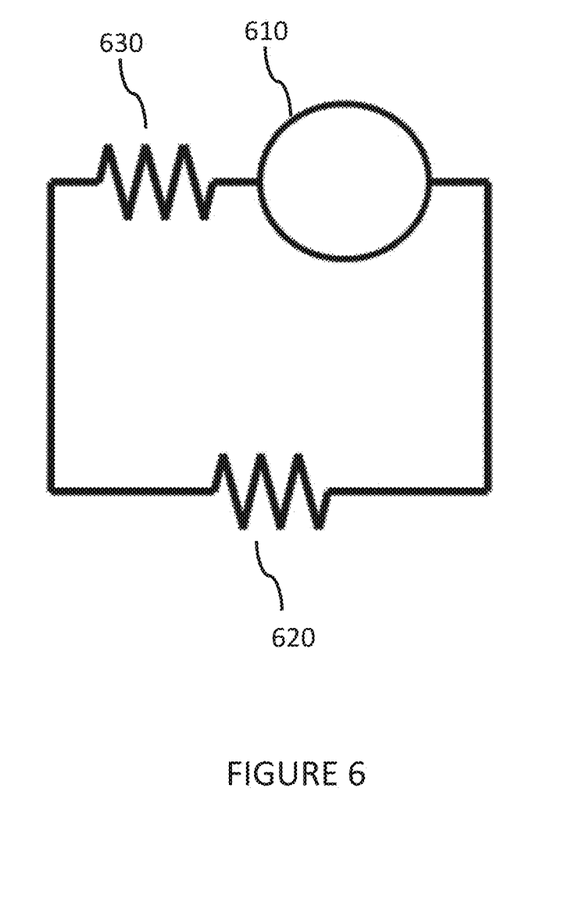
FIG. 6 is circuit model for derivation of power figure of merit.

The other figure of merit is the peak power produced per unit volume, $p_v$. To formulate an expression for $p_v$, start with the familiar expression for the power $p_{load}$ that is dissipated by the electrical load $$p_{load} = \frac{V_{load}^2}{R_{load}} \qquad \text{(Eq. 19)}$$

where $V_{load}$ is the voltage delivered to the load and $R_{load}$ is the resistance of the load. FIG. 6 shows this schematically. $V_{load}$ can be calculated based on the voltage V (610) produced by the harvester, $R_{load}$ (620) and the internal resistance $R_{int}$ (630) associated with the harvester:

$$V_{load} = V\frac{R_{load}}{R_{load} + R_{int}} \qquad \text{(Eq. 20)}$$

The power can then be written as:

$$p_{load} = \frac{V^2 R_{load}}{(R_{load} + R_{ct})^2} \qquad \text{(Eq. 21)}$$

In the above equation it is assumed that $R_{int}$ is the charge transfer resistance of the material $R_{ct}$. This neglects other resistances associated with the system, and instead represents a materials property. Consider the case in which the load is impedance matched with the source such that $R_{load} = R_{ct}$ and the maximum power possible is delivered to the load. Including these assumptions and normalizing by volume V gives:

$$p_v = \frac{V^2}{4R_{ct}V} \qquad \text{(Eq. 22)}$$

where $p_v$ is the maximum power that could be delivered to an electrical load by a piezoelectrochemical material. An expression for V and $R_{ct}$ is desired. The voltage produced is $K\sigma$ as discussed previously. The charge transfer resistance can be expressed as $$R_{ct} = \frac{R_{gas}T}{nFi_oaV} \qquad \text{(Eq. 23)}$$

If linearized Butler Volmer kinetics is assumed. Here $i_o$ is the exchange current density and a is surface area per volume. The volume V used here is again the volume of only the active material, neglecting any contribution from components necessary to a practical cell such as current collectors and electrolyte. The assumption of linearized kinetics is valid for the case of small voltages, which is reasonable in this situation given the relatively low magnitudes of the voltages produced by mechanical stress in these materials.

The expression for $R_{ct}$ can be substituted into the $p_v$ expression to arrive at figure of merit for the maximum deliverable power per unit volume of material:

$$p_v = \frac{nFai_oK^2\sigma^2}{4R_{gas}T} \qquad \text{(Eq. 8)}$$

where a is specific area (m$^2$/m$^3$), $i_o$ is exchange current density, $R_{gas}$ is the ideal gas constant, and T is temperature.

One can see from this figure of merit that materials with high surface areas, high exchange currents, and high coupling factors are favorable for producing high power. Also an important consideration is the maximum stress that can be reversibly applied to the harvester material, which places limitations on the maximum magnitude of $\sigma$.

The estimated $p_v$ values in Table 1 are calculated assuming a surface area of $4\times10^6$ m$^2$/m$^3$ for a 1 micron diameter particle, and the K values presented previously in the discussion of energy density calculation. All anisotropic materials are assumed to be oriented with the highest expansion direction parallel to the loading axis. These estimated $p_v$ values are all generally on the order of W/cm$^3$, with the exception of the C(HSO$_4$)$_x$ system which is estimated 10 mW/cm$^3$ range. However, this estimate comes with the caveat that the $i_o$ value is a complete estimate being assumed to be a factor of 10 lower than the Li$_x$C$_6$ system. It may be possible that the kinetic penalty for the larger volume expansion of the C(HSO$_4$)$_x$ compared with the Li$_x$C$_6$ is greater than a factor of 10, resulting in a lower value for $i_o$. As seen in Table 1, values for piezoelectrochemical systems can currently be expected to be between and including $1\times10^{-4}$ mW/cm$^3$ and 20 mW/cm$^3$ with an applied load of 50 MPa.

TABLE 1

| Material | K mV/MPa | $\Delta q_v$ C/cm3 | $\left(\frac{\partial U_o}{\partial q_v}\right)^{-1}$ C/(mV-cm3) | $\gamma$ mJ/cm3 | $i_o$ a/m2 | $p_v$ mW/cm3 |
|---|---|---|---|---|---|---|
| $Li_xC_6$ (0.5 < x < 0.9) | 0.033 | 1119 | — | 1850 | 0.01 | 0.0011 |
| $Li_xC_6$ (0.08 < x < 0.17) | 0.062 | 252 | — | 779 | 0.01 | 0.0037 |
| $Li_yCoO_2$ (0.75 < y < 0.93) | −0.0095 | 1749 | — | 834 | 0.1 | 0.00088 |
| $Li_xSi$ | 0.056 | — | 68.4 | 271 | 0.01 | 0.0031 |
| $C(HSO_4)_x$ (0 < x < 0.17) | 13.5 | 285 | 8.92 | 193,000 | 0.001 | 18 |
| Conventional Piezoelectrics | — | — | — | 20 | — | 1 |

The calculations for both of the $Li_xC_6$ compounds are based on data reported in literature. The tabulated composition ranges of (0.5<x<0.9) and (0.08<x<0.17) both correspond to concentration ranges in which LixC6 exhibits two-phase behavior. This behavior is characterized by a constant equilibrium potential with respect to lithium concentration as well as a constant rate of expansion with respect to lithium concentration. The (0.5<x<0.9) region corresponds to the phase transition from stage 2 to stage 1 graphite which occurs at 85 mV vs. Li/Li+. The complete phase transition is associated with a c-axis strain of 0.0507 and a volumetric capacity of 1:54109 C/m³. The (0.08<x<0.17) region corresponds to the phase transition from stage 8 to stage 4 graphite at 210 mV. The complete phase transition is associated with a c-axis strain of 0.0171 and a volumetric capacity of 2:77108 C/m³. These properties are used in Equation 16 to calculate $\Upsilon$.

The calculations for the $LiyCoO_2$ system are based on data reported in literature. The tabulated composition range (0.75<y<0.93) corresponds to a concentration range in which $Li_yCoO_2$ exhibits two-phase behavior. This two-phase region is characterized by a constant equilibrium potential with respect to lithium concentration and a rate of expansion that varies linearly with lithium concentration. This means that K is expected to vary with concentration in this region. However, for the sake of simplicity, K is approximated as constant by assuming uniform strain between the initial and final lithium concentrations in the (0.75<y<0.93) range. The average c-axis strain is 0.00827 with a volumetric capacity of 8:67 108 C/m³. These properties are used in Equation 16 to calculate $\Upsilon$.

The K value for the $Li_xSi$ system is based on experimental measurements of the stress-voltage coupling in an amorphous lithiated silicon thin film under biaxial stress reported in literature. K is reported to be between 0.1 and 0.125 mV/MPa for a biaxial load. In Table 1, K is assumed to be 0.056 mV/MPa for a uniaxial load, which represents half of the midrange value reported in literature. Unlike the previous systems, the $Li_xSi$ system does not exhibit well-defined constant-voltage plateaus. Therefore, $\Upsilon$ is calculated through Equation 18, using for $$\left(\frac{\partial U_o}{\partial q_v}\right)^{-1}$$

a value of 68.4 C/(mV-cm³), which is based on the experimentally measured 0.121 mV/(mAh-g) value reported in literature.

The K value for $C(HSO_4)_x$ is based on reported values of the stress-voltage coupling in HOPG in $H_2SO_4$ as determined from experimental measurements in literature in which a uniaxial load is applied parallel to the c-axis of the HOPG. In this concentration range the equilibrium potential increases linearly with concentration with a slope 1.88 V/x, where x is the molar fraction of HSO4 in $C(HSO_4)_x$, as estimated from the slopes of the plots of voltage versus concentration published in literature. This corresponds to $$\left(\frac{\partial U_o}{\partial q_v}\right)^{-1} = 8.92 \; C/(mV - cm^3).$$

The energy density as calculated using Equation 18 is then $2.03 \times 10^6$ mJ/cm³, which is 5 orders of magnitude higher than for piezoelectrics. However, because K for this system is so high, the concentration range that is utilized by the K$\sigma$ voltage increase assuming 50 MPa corresponds to a concentration greater than the assumed range of (0<x<0.17). If limited to the Δx=0.17 concentration range, Equation 16 can be used to calculate $\Upsilon$, resulting in a lower value of $1.93 \times 10^5$ mJ/cm³, only 4 orders of magnitude higher than for piezoelectrics. It is this lower value that is reported in Table 1. The best estimate of $\Upsilon$ lies somewhere between these two calculated values.

Values for volumetric power output $p_v$ is harder to estimate, as it requires assumptions about surface area a and exchange current $i_o$. The surface area can vary many orders of magnitude depending on the assumed construction of the device. For reference, the surface area for 1 micron diameter spherical particles is about $4 \times 10^6$ m²/m³. Using nano-scale particles or nanostructured electrodes (e.g. silicon nanopillars) can further increase this surface area value by a few factors of 10. The exchange current density is sensitive to many parameters, most notably choice of materials and lithium concentration.

For lithium insertion materials, $i_o$ values on the order of 0.01 and 0.1 A/m² are typical. These order of magnitude values correspond to $Li_xC_6$ and $Li_yCoO_2$ systems, respectively. Higher $i_o$ values on the order of 10 A/m² can be expected for electrochemical reactions with faster kinetics such as lithium deposition on lithium metal. The $i_o$ values used in Table 1 for the $Li_xSi$ and $C(HSO_4)_x$ systems are assumed to be the same as $Li_xC_6$ and a factor of 10 lower than that of $Li_xC_6$, respectively.

The micro-W/cm3 range $p_v$ values for the lithium-based piezoelectrochemical systems are on the low end of the spectrum of conventional mechanical energy harvester $p_v$ values, which are typically in the micro-W/cm3 to mW/cm3 range. This is expected, as the electrochemical processes associated with the piezoelectrochemical systems are generally slower than the electrostatic processes associated with the conventional mechanical energy harvesting systems. Note that more favorable $p_v$ values could be obtained for the piezoelectrochemical systems by pursuing nanostructuring strategies to increase surface area, which could reasonably increase the $p_v$ values by one or more factors of 10. It should also be noted that in a practical system, there would also be limitations associated with ion transport in the electrolyte, which could conceivably limit the power of a system containing high surface area electrodes.

Experimental Demonstration

Based on the materials survey in Table 1, a graphite/lithium cobalt oxide lithium insertion system is expected to have a relatively high coupling factor. These electrodes can be sandwiched together and mechanically loaded in series because the coupling factors have opposite signs. That is, the potential of a graphite electrode decreases due to an applied compressive stress whereas the potential of a lithium cobalt oxide increases. For a cell with a graphite negative electrode and a lithium cobalt oxide positive electrode, the total cell voltage is expected to increase under applied stress due to contributions from both electrodes. This system has a practical advantage for experimentation in that a commercial pouch cell essentially is a graphite/lithium cobalt oxide piezoelectrochemical harvester. To demonstrate the working principle, pouch cells are used in the dual-cell configuration shown in FIG. 2e. Such a configuration ensures that no contributions to the energy output are generated by a charging device as could conceivably be the case with the configuration in FIG. 2f using a potentiostat.

Figure 4:
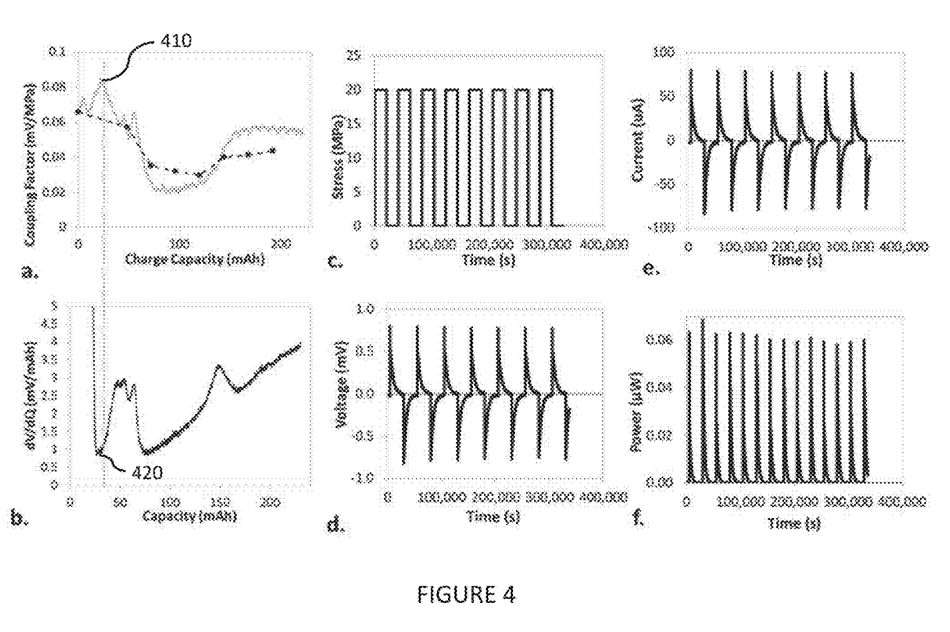
FIG. 4 is a series of plots describing performance of an experimental embodiment of the present invention.

The coupling factor for the pouch cell is expected to vary as a function of state of charge because the rate of cell expansion of both graphite and lithium cobalt oxide vary with lithium concentration. To maximize the power output of the piezoelectrochemical harvester, it is desirable to choose a state of charge corresponding to a high coupling factor. The other consideration is the slope of the voltage curve, which dictates how much charge can be extracted as a result of an applied load as shown schematically in FIG. 3b. A lower slope results in a higher charge capacity and therefore a higher energy per cycle. This is analogous to the previously discussed $\partial U_o / \partial c_s$ materials parameter, whose inverse can be interpreted as a measure of capacitance. To take both of these parameters into consideration, plots of the coupling factor and voltage curve slope for the pouch cell are shown in FIGS. 4a and 4b, respectively. Comparing these curves, the highest (peak) coupling factor (410) and lowest voltage curve slope (420) fortuitously occur in the same state of charge range, as indicated by the overlaid dashed line. Consequently, to demonstrate the piezoelectrochemical mechanical energy harvesting technique, the pouch cells are charged to this state of charge range.

The use of a pouch cell as a piezoelectrochemical energy harvester in the dual cell configuration is demonstrated by the electrical output plotted in FIGS. 4c-4f. FIG. 4c depicts the stress applied to the cell (in MPa) over time, while FIGS. 4d-4f illustrate the voltage (in mV), current (in micro-A), and power (in micro-W), respectively, that was generated by the applied stress. In this configuration, the negative leads of both pouch cells are electrically connected and the positive leads of both pouch cells are connected by a 10 Ohm resistor. The resistor represents an electrical load to which power is delivered by the harvester. The power delivered to the load resistor is determined by measuring the voltage across the resistor. In this configuration a positive voltage indicates that the voltage of the working cell is higher than that of the negative cell. A positive voltage can also be interpreted as current flowing from the working cell to the reference cell such that the reference cell is charged by discharging the working cell. The opposite is true for a negative voltage. The 10 Ohm resistor is chosen for this experiment because this approximately matches the impedance of both cells added serially. As shown in FIG. 4a, the working pouch cell is subjected to a cyclic square wave load between 0 and 20 MPa with a frequency of 20 micro-Hz. At stresses above 20 MPa, significant cell degradation occurs due largely in part to separator deformation, resulting in an unsteady output and internal short circuiting of the working pouch cell.

The voltage output that results from cyclic loading is plotted in FIG. 4d. FIG. 4d shows that the voltage increases when the cell is loaded and decreases by the same amount when the cell is unloaded, as expected based on the analysis presented in FIG. 3. The voltage decays as the working cell discharges under the influence of the applied load. As shown in FIG. 3b, this voltage decay is due to a decrease in voltage of the working cell as it is discharged and a corresponding increase in voltage of the reference cell as it is charged. The voltage eventually reaches 0 V when the voltage of the working cell decreases by the same voltage magnitude that the reference cell increases. Note that part of the temporal decay of voltage is also due to overpotentials associated with the electrochemical reactions and ohmic losses associated with current flow.

The power delivered to the load resistor is calculated by $$\frac{V_{load}^2}{R_{load}}$$

and plotted in FIG. 4f. The power output for this pouch cell energy harvester is low, peaking around 0.06 W. The energy associated with each load/unload cycle (one positive peak plus one negative peak) is about 0.25 mJ. At over 1 cm$^3$ in volume for the pouch cell, this represents a cycle energy orders of magnitude lower than that expected for piezoelectrochemical harvester and still lower than conventional mechanical energy harvesters. The low output is not all that surprising given the unoptimized nature of a pouch cell. Based on the properties plotted in FIGS. 4a and 4b, the pouch cell should at best be expected to produce a single cycle energy output of around 1 mJ. Because the cell is roughly impedance matched, half of the available energy will be consumed through resistive losses, limiting the energy that can be delivered to the load to 0.5 mJ. The 1 mJ theoretical energy output is also calculated assuming that the pouch cells are both charged to the ideal state of charge. Any deviation from this state of charge will reduce the energy output of the cell.

While this pouch cell system demonstrated here represents a proof of concept, there is clearly much room for improvement. An easy next step to boost the energy output of a lithium cobalt oxide/graphite based system is to tune the concentrations of lithium in the electrodes individually before assembling the cell. For example, the graphite electrode could be lithiated to the two phase region (stage 1 and stage 2) occurring between $Li_{0.5}C_6$ and $Li_{0.9}C_6$, which exhibits a very low voltage slope and relatively high expansion, which translates to a high capacity as seen in Table 1. Similarly the lithium cobalt oxide electrode could be lithiated to the two phase region that occurs between $Li_{0.75}CoO_2$ and $Li_{0.93}CoO_2$, which also exhibits a low voltage slope and relatively high expansion. As a general rule, electrochemically-induced phase transformations can offer attractive properties, as they are usually associated with relatively high expansions and low voltage slopes. Beyond the graphite/lithium cobalt oxide system, other systems with higher coupling factors such as the graphite+$HSO_4$ could offer significantly higher energy densities, as predicted by the calculations in Table 1. Nanostructuring the electrodes could also help reduce the power losses associated with overpotentials, thereby increasing the power that can be delivered to a load.

What is claimed:

1. An electrochemical cell, comprising:
a plurality of electrodes; and
an electrolyte,
wherein at least one of the plurality of electrodes is a piezoelectrochemical material, and wherein the electrochemical cell is configured such that an applied compressive stress directly causes a change in an electrochemical potential of at least one of the plurality of electrodes.

2. The electrochemical cell of claim 1, wherein:
at least one of the plurality of electrodes comprises at least one of graphite, $LiCoO_2$, silicon, manganese oxide, a graphite intercalation compound, or a lithium metal oxide.

3. The electrochemical cell of claim 1, wherein the electrochemical cell is a battery.

4. The electrochemical cell of claim 1, wherein the piezoelectrochemical material is a solid or liquid at standard temperature and pressure.

5. The electrochemical cell of claim 1, wherein the electrolyte is a solid.

6. The electrochemical cell of claim 1, further comprising a separator.

7. The electrochemical cell of claim 1, wherein the magnitude of the peak coupling factor between the plurality of electrodes is greater than 0.001 mV/MPa.

8. The electrochemical cell of claim 7, wherein the magnitude of the peak coupling factor between the plurality of electrodes is between 0.001 and 50 mV/MPa, and wherein the piezoelectrochemical material comprises lithium.

9. The electrochemical cell of claim 1, wherein the theoretical energy density per unit stress of the piezoelectrochemical material is greater than or equal to 1 $mJ/cm^3$/MPa.

10. The electrochemical cell of claim 9, wherein the theoretical energy density per unit stress of the piezoelectrochemical material is between and including 1 $mJ/cm^3$/MPa and 5,000 $mJ/cm^3$/MPa.

11. The electrochemical cell of claim 1, wherein the theoretical power density of the piezoelectrochemical material is greater than or equal to $1 \times 10^{-4}$ $mW/cm^3$ with an applied load of 50 MPa.

12. The electrochemical cell of claim 11, wherein the theoretical power density of the piezoelectrochemical material is between and including $1 \times 10^{-4}$ $mW/cm^3$ and 20 $mW/cm^3$ with an applied load of 50 MPa.

13. A system for harvesting mechanical energy, comprising at least one electrochemical cell of claim 1; and at least one other energy storage device.

14. The system according to claim 13, wherein the at least one other energy storage device is at least one of a capacitor, battery, or electrochemical cell of claim 1.

15. A distributed sensor network, comprising:
a plurality of sensors; and
at least one electrochemical cell of claim 1,
wherein the at least one electrochemical cell is adapted to provide an electric connection to one or more of the plurality of sensors.

16. A method for converting mechanical to electrical energy, comprising the steps of:
selecting electrode materials for an electrochemical cell such that at least one electrode undergoes a change in its electrochemical potential as a direct consequence of an applied compressive stress;
configuring the electrochemical cell to discharge at a first voltage while a mechanical stress is applied; and
configuring the electrochemical cell to charge at a second voltage when the mechanical stress is removed, wherein the second voltage is less than the first voltage.

17. The method according to claim 16, wherein the method comprises at least one of the following:
wherein selecting electrode materials further comprises selecting a material for a first electrode such that it comprises a material having an opposite-signed coupling constant from a second electrode;
wherein selecting electrode materials further comprises selecting a material for a first electrode such that it comprises a material having a greater coupling constant than a second electrode; or
configuring the electrochemical cell such that the applied mechanical stress on a first side of the electrochemical cell is capable of being different than the applied mechanical stress on a second side of the electrochemical cell.

18. The method according to claim 16, wherein the electrochemical cell is adapted to receive mechanical stress from human footsteps, vehicular tires, or pressure vessels.

19. The method according to claim 16, wherein the coupling constant for the electrochemical cell is between about 0.001 mV/MPa and about 20 mV/MPa under uniaxial loading and expansion.

20. The method according to claim 16, wherein the electrochemical cell is adapted to allow mechanical stress to be applied by bending the electrochemical cell.

21. The method according to claim 16, wherein the electrochemical cell is adapted to allow mechanical stress to be applied non-uniformly in one or more directions.

22. An electrochemical cell, comprising:
a plurality of electrodes; and
an electrolyte,
wherein each of the plurality of electrodes is a piezoelectrochemical material, and
wherein the electrochemical cell is configured such that an applied compressive stress alters the thermodynamics of an electrochemical reaction to produce a change in at least one electrical property selected from the group consisting of voltage and current.

23. The electrochemical cell according to claim 22, wherein the at least one electrical property is voltage.

* * * * *